United States Patent
Showen et al.

(10) Patent No.: US 10,032,351 B2
(45) Date of Patent: *Jul. 24, 2018

(54) SYSTEMS AND METHODS ASSOCIATED WITH DETECTION OF INDOOR GUNFIRE

(71) Applicant: SHOTSPOTTER, INC., Newark, CA (US)

(72) Inventors: Robert Showen, Los Altos, CA (US); James Beldock, Hillsborough, CA (US); Gregory Stone, Santa Clara, CA (US); Murphey Johnson, Austin, TX (US); Robert Calhoun, Oberlin, OH (US)

(73) Assignee: ShotSpotter, Inc., Newark, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/997,893

(22) Filed: Jan. 18, 2016

(65) Prior Publication Data

US 2016/0133107 A1    May 12, 2016

Related U.S. Application Data

(63) Continuation of application No. 14/231,604, filed on Mar. 31, 2014, now Pat. No. 9,240,114.

(Continued)

(51) Int. Cl.
  *G08B 17/00* (2006.01)
  *G08B 17/08* (2006.01)
  (Continued)

(52) U.S. Cl.
  CPC ............... *G08B 17/08* (2013.01); *G01S 5/18* (2013.01); *G08B 13/1672* (2013.01); *G08B 29/183* (2013.01); *G08B 29/188* (2013.01)

(58) Field of Classification Search
  CPC .. G08B 17/08; G08B 29/188; G08B 13/1672; G08B 29/183; G01S 5/18
  See application file for complete search history.

(56) References Cited

U.S. PATENT DOCUMENTS

| | | |
|---|---|---|
| 6,621,764 B1 | 9/2003 | Smith |
| 7,423,934 B1 | 9/2008 | Uzes |

(Continued)

FOREIGN PATENT DOCUMENTS

| | | |
|---|---|---|
| EP | 1806952 A2 | 7/2007 |
| EP | 2046040 A2 | 4/2009 |
| EP | 2439708 A1 | 4/2012 |

OTHER PUBLICATIONS

European Search Report received in counterpart EP patent application No. 14779333.5, dated Dec. 9, 2016; 11 pages.

(Continued)

*Primary Examiner* — Hovhannes Baghdasaryan
(74) *Attorney, Agent, or Firm* — Knobbe, Martens, Olson & Bear LLP

(57) ABSTRACT

Systems and methods are disclosed for reliably detecting gunfire in enclosed spaces having significant acoustic reverberation. Implementations are configured to quickly and reliably report the room or portion of a room where gunfire is located. Innovations herein may ensure low false alarm rate by thresholding, pattern recognition and/or detecting the muzzle optical flash. In some embodiments, a review center with trained personnel may evaluate the incident before reporting to local authorities. The indoor system can be incorporated into an outdoor gunshot location system to better protect a local area such as a campus or a transportation hub. Systems and methods herein may involve features and functionality associated with additional resources, (Continued)

such as intercoms, cellphones, and access control, to provide mitigation of harm in case of a shooting.

24 Claims, 7 Drawing Sheets

Related U.S. Application Data

(60) Provisional application No. 61/806,920, filed on Mar. 31, 2013.

(51) Int. Cl.
    *G08B 13/16*     (2006.01)
    *G08B 29/18*     (2006.01)
    *G01S 5/18*     (2006.01)

(56) References Cited

U.S. PATENT DOCUMENTS

| | | |
|---|---|---|
| 7,586,812 B2 | 9/2009 | Baxter et al. |
| 7,796,470 B1 | 9/2010 | Lauder et al. |
| 7,844,248 B2 | 11/2010 | Sotack |
| 8,421,015 B1 | 4/2013 | Scott et al. |
| 2004/0100868 A1 | 5/2004 | Patterson et al. |
| 2005/0001720 A1 | 1/2005 | Mason et al. |
| 2009/0028347 A1 | 1/2009 | Duraiswami et al. |
| 2009/0058630 A1 | 3/2009 | Friar et al. |
| 2010/0245582 A1 | 9/2010 | Harel |
| 2012/0229275 A1 | 9/2012 | Mattern |

OTHER PUBLICATIONS

International Search Report, Written Opinion, and Transmittal in related PCT patent application No. PCT/US2014/032428, dated Oct. 27, 2014 (12 pgs.).

"Invitation to Pay Additional Fees and, Where Applicable, Protest Fee," in related PCT patent application No. PCT/US2014/032428, dated Aug. 5, 2014 (2 pgs.).

SYSTEMS AND METHODS ASSOCIATED WITH DETECTION OF INDOOR GUNFIRE

CROSS-REFERENCE TO RELATED APPLICATION INFORMATION

This is a continuation of application Ser. No. 14/231,604, filed Mar. 31, 2014, published as US2014/0327543A1, now U.S. Pat. No. 9,240,114, and claims benefit/priority to provisional patent application No. 61/806,920, filed Mar. 31, 2013, all of which are incorporated herein by reference in entirety.

BACKGROUND

Field

Aspects of the present innovations pertain to the detection of indoor gunfire, including features relating to indoor and/or combined indoor and outdoor gunshot detection/location systems, and implementations herein may also involve features associated with the rapid dissemination of this information to at-risk persons, law enforcement, and/or alert facilities.

Description of Related Information

Existing systems for the detection of outdoor gunfire (e.g., ShotSpotter Gunshot Location Systems) have been utilized to the great benefit of law enforcement and the citizens they protect. The ShotSpotter systems enable police to respond quickly to the exact shooting location with foreknowledge of the number of shots and their sounds. This capability is a great improvement over merely using 911 calls, which typically report under 25% of the actual gunfire in a community, and then often the location is given only within a couple of blocks.

OVERVIEW OF SOME ASPECTS

One or more aspects of the present innovations may augment present outdoor urban gunshot location systems which provide near real-time notification of outdoor gunfire locations, the severity of the incident, and a searchable record of prior gunshot activity. Advantages of some embodiments herein involve detecting indoor gunfire while achieving a high probability of detection and a low probability of false alarms. Implementations herein may be used in campuses, in transportation hubs such as airports, train or subway stations, and in other public or private gathering places.

Indoor gunshot detection systems consistent with the innovations herein may be implemented using sensors placed in rooms or corridors, and connected to a network which allows many rooms, for example in a school campus, to be reported to a central computer. Upon a shooting incident, the system may pass the data to humans in a review center who may issue alerts to first responders and to at-risk persons nearby. Advantages may include reducing the harm during an attack. Further, implementations herein may be configured with adjustability features to report only extremely loud acoustic events and not normal human voices in a classroom, for example.

According to illustrative embodiments, a standard outdoor gunshot location system using widely spaced sensors placed on buildings or utility poles may be augmented with special indoor sensors mounted on a room wall or ceiling. These indoor sensors may detect and, in some implementations, classify gunfire or fireworks in small or large rooms. The loud and abruptly-rising acoustic impulse of an indoor explosion (e.g., with strengths greater than 120 dB SPL) may easily be distinguishable from normal activities. As a guard against false alarms, some implementations may add an IR sensor to detect the muzzle optical flash in addition to the muzzle acoustic blast. An IR sensor may also permit the distance to the shot to be calculated and may aid in classification. Depending on circumstances, implementations configured with, or to process signals from, either IR detectors alone or acoustic detector alone may be sufficient to reliably report gunfire.

Although an indoor gunshot may not be heard outdoors in some cases, if it is, then the outdoor system and the indoor sensors may together give a better location than either alone. The indoor sensors, using connectivity methods such as radio or wired connections, may be configured to communicate to a nearby outdoor sensor and so be interconnected with an overall system.

According to some implementations, the indoor system (just as in some outdoor systems) may have a trained human in-the-loop to assist the computer algorithms in qualifying an incident before issuing an alert. Here, for example, a single indoor shot of sufficient strength may produce a putative event in a particular room, and the impulse characteristics plus a few seconds of sound can be sent to a dedicated review center where the event is determined to be a threat (or not) by the reviewers. The reviewer(s) may look at waveform amplitudes and shapes and also listen for any room occupant reactions (words or screams) to assist in the evaluation. An event which sounds and looks like gunfire with audible screams may be handled differently from an event which has a loud clap followed by laughter.

Systems and methods herein may also involve different implementations of alerting between a traditional outdoor gunshot location system and an indoor or campus-wide system such as that the latter may have, in addition to notification of responding officers, additional features of notifying at-risk persons (e.g., staff, students, public) during the incident and coordinating their subsequent actions with first responders to minimize harm. Mitigation of harm in case of a campus shooting is of paramount concern. Additional resources may be coordinated with the gunfire detection system to mitigate harm, such as communicating with cellphones, intercoms, and access control systems.

DETAILED DESCRIPTION

Reference will now be made in detail to the inventions herein, examples of which are illustrated in the accompanying drawings. The implementations set forth in the following description do not represent all implementations consistent with the present inventions. Instead, they are merely some examples consistent with certain aspects related to the present innovations. Wherever possible, the same reference numbers will be used throughout the drawings to refer to the same or like parts.

Systems and methods of indoor gunshot detection, or of combined indoor-outdoor gunshot location, consistent with aspects of the innovations herein may involve various differences and/or distinctions from existing outdoor-only systems. For example, features of alerting a crowded campus may involve not only notification to first responders, but also communication with affected local personnel. In an outdoor system, the large distances to cover and the presence of buildings which distort the acoustic paths by blockage, echoing, and refraction may cause systems to require more than 4 responding sensors to obtain good locations with reliable coverage. An indoor sensor may be so close to a shot that the shot will be readily detectable and the burden may shift to avoiding false alarms from normal or spoofing sounds. "Strong" impulsive strengths from gunfire—pistols to rifles—range in amplitude from about 120 to about 160 dB SPL. According to certain implementations herein, impulsive events smaller than this can be ignored.

Various implementation may also utilize two separate audio channels: a highly attenuated channel configured to detect very loud sounds, and a more sensitive acoustic channel that may be configured to record and report sounds of any human response.

Further, some implementations may process the acoustic reverberation of gunfire in a room to determine that a particular impulse had reverberation times consistent with the known room volume and acoustic treatment on the interior. In other implementations, an impulsive sound can be produced near sensor installation so that a record of the waveform can be kept and utilized to check against an actual event. Also, impulses from several locations in a room can be taken and an approximate room location may be inferred by pattern matching when a real event takes place.

Figure 1:
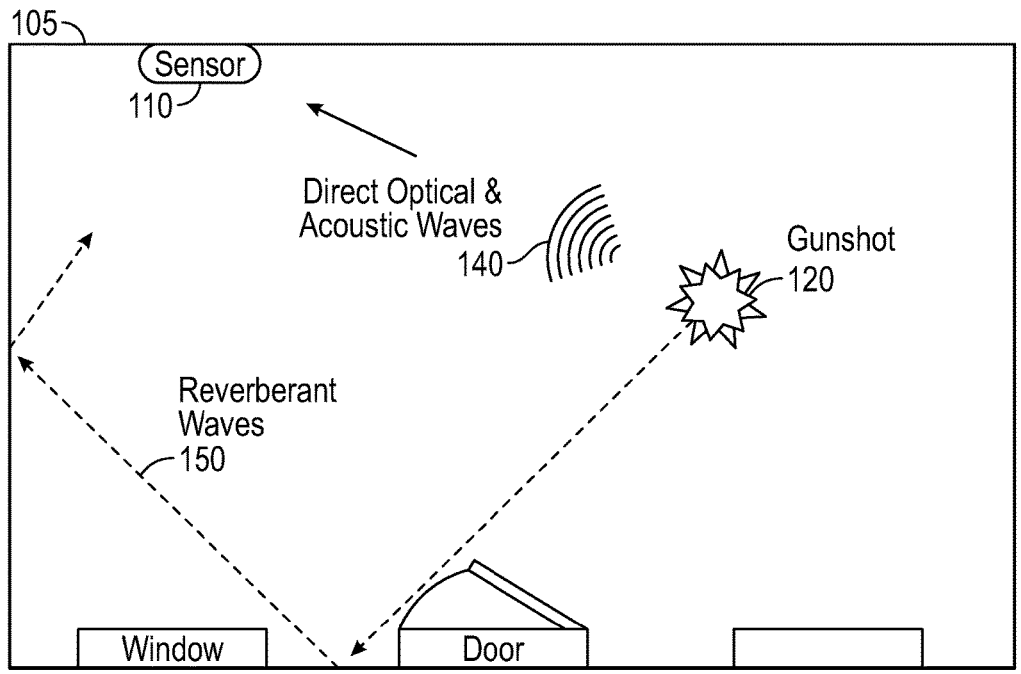
FIG. 1 is a diagram of exemplary gunfire detection in a single room consistent with one or more aspects related to the innovations herein.

FIG. 1 is a diagram of exemplary gunfire detection in a single room consistent with one or more aspects related to the innovations herein. According to implementations herein, an indoor sensor on the room periphery (wall or ceiling) is utilized to detect the direct optical and acoustic waves from the gunshot. The optical waves, strongest in the IR region, will arrive before the acoustic waves, and the measured difference in arrival times may be processed to provide the distance from the gunfire to the sensor. Further, reflection of the acoustic waves (referred to as reverberant waves in FIG. 1) bouncing in three dimensions will extend the acoustic response time, and implementations herein may process such adjusted characteristics as set forth below.

FIG. 1 is a diagram of an indoor sensor 110 on the wall of a classroom 105 showing direct 140 and reflected 150 waves from a gunshot 120. The indoor sensor 110 may be disposed on the room periphery (e.g., wall or ceiling), for example, and may detect the direct 140 and reflected 150 optical and acoustic waves from the gunshot. The direct and reflected waves may arrive substantially instantaneously at the optical IR sensor, while the direct acoustic wave may arrive later with the reflected acoustic waves decaying over a fraction of a second.

Figure 2:
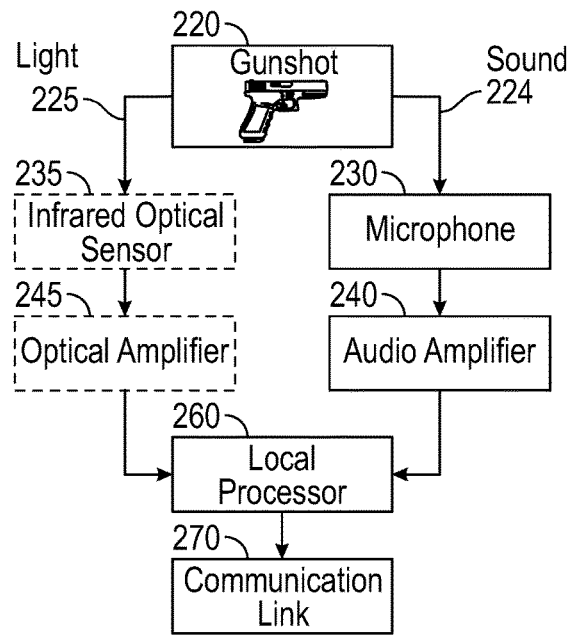
FIG. 2 is a diagram of an illustrative indoor sensor with acoustic and IR detectors consistent with one or more aspects related to the innovations herein.

FIG. 2 is a diagram of an illustrative indoor sensor with acoustic and IR detectors consistent with one or more aspects related to the innovations herein. FIG. 2 shows two sensor types 230 and 235 and two amplifiers 240 and 245 receiving the waves 224 and 226 from a gunshot 220. The signatures may be sent to a local processor 260 to be digitized and sent off to the system via a communications link 270. Assuming that the microphone and IR detector are co-located, the difference in time between their onsets is processed via innovations herein to yield the distance from the shooter to the sensor. For example, the difference in arrival times between the IR and acoustic impulses, as processed at 260, may be utilized to provide the range to the weapon assuming the sensors are co-located. Furthermore, systems and methods herein may utilize a knowledge of the range to determine the absolute strength of the weapon and hence an appropriate processing threshold level to accept or reject the impulse as a gunfire candidate.

Figure 3:
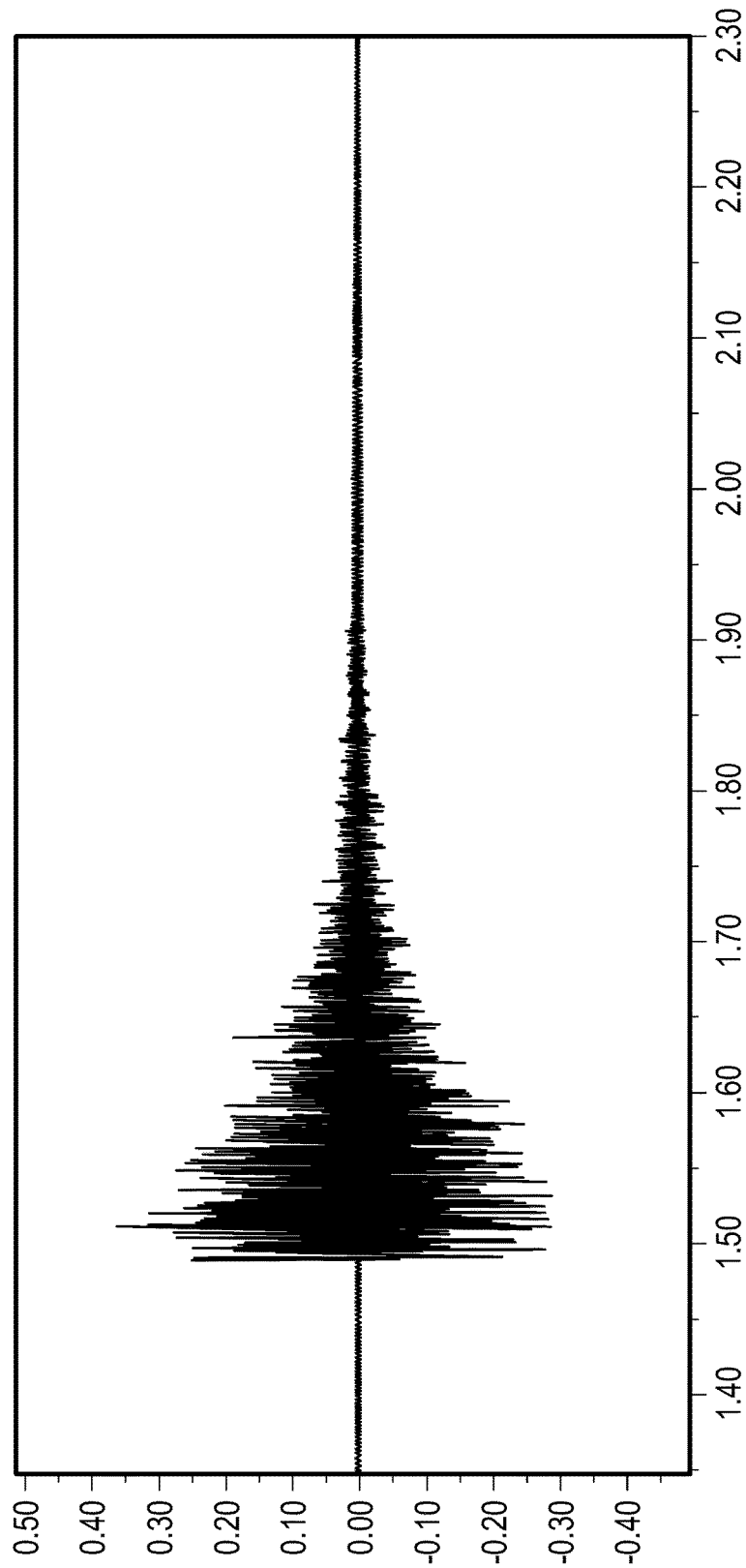
FIG. 3 illustrates exemplary acoustic reverberation of a pistol shot in a small classroom consistent with one or more aspects related to the innovations herein.

FIG. 3 illustrates exemplary acoustic reverberation of a pistol shot in a small classroom consistent with one or more aspects related to the innovations herein. FIG. 3 shows the measured acoustic decay of a pistol shot in a small classroom. The example classroom has a size of 20×40×10 feet, with the reverberation fall-off in time of 0.7 s being dependent on the room size and the wall absorption. Here, the indicated reverberation time of $RT_{60}$ of 0.7 s is to a value 60 dB below the peak. On this scale such a small value may not be discernible. The standard architectural Sabine time to decay to 60 dB below the peak can be used, or, since the actual rooms could have noisy students present, a modified Sabine decay to 20 or 30 dB may also be utilized, which may be easier to measure in the presence of moderate noise. The standard Sabine equation for Reverberation Time (RT) decaying to 60 dB below peak is:

$$RT_{60} = \frac{4 \ln 10^6}{c} \frac{V}{Sa} \approx 0.1611 \text{ m}^{-1} \frac{V}{Sa}$$

... and for 30 or 20 dB decay, the values are $RT_{30} = 4 \ln 10^3 V/(cSa) = 0.0806 \, V/Sa$ $RT_{20} = 4 \ln 10^2 V/(cSa) = 0.0537 \, V/Sa$ Here c is speed of sound 343 m/s, V is room volume in m^3, S=surface area in m^2, and a is the acoustic attenuation coefficient.

The measured $RT_{60}$ of 0.7 sec in FIG. 3 is consistent with the size of the room and typical acoustic attenuation coefficients corresponding, e.g., to classrooms.

One measure that may be utilized by systems and methods herein to better discriminate acoustically between gunfire and other sounds in confined spaces is to determine the frequency of the impulse—such as by using a median frequency which is the frequency where the spectral power is half above and half below the median. Another measure that may be utilized is the slope of the decay for those cases where the impulse is saturated (as in FIG. 4) and it is hard to estimate the peak to decay ratio values. An additional measure that may be utilized herein is the onset time, which may be compared against the known abrupt onset of true gunfire. Measured onsets that are distinct from the known onsets may be discarded and/or otherwise processed or utilized in the innovations herein. Further, as indicated elsewhere herein, the absolute value of the peak impulse signature will need to surpass a threshold, e.g., corresponding to about 120 dB SPL re 1 m.

In some implementations, in order to reduce the likelihood of a false alarm, especially in the presence of deliberate spoofing, an additional detection modality can be used. For example, an infrared (IR) sensor may be added to detect a muzzle flash. The IR arrival time is sooner than the first acoustic arrival, and the difference in arrival times dt is proportional to the range from the source to the sensor. Quantitatively, the range is c*dt, where the speed of sound c is about 343 m/s or 1100 ft/s.

Figure 4:
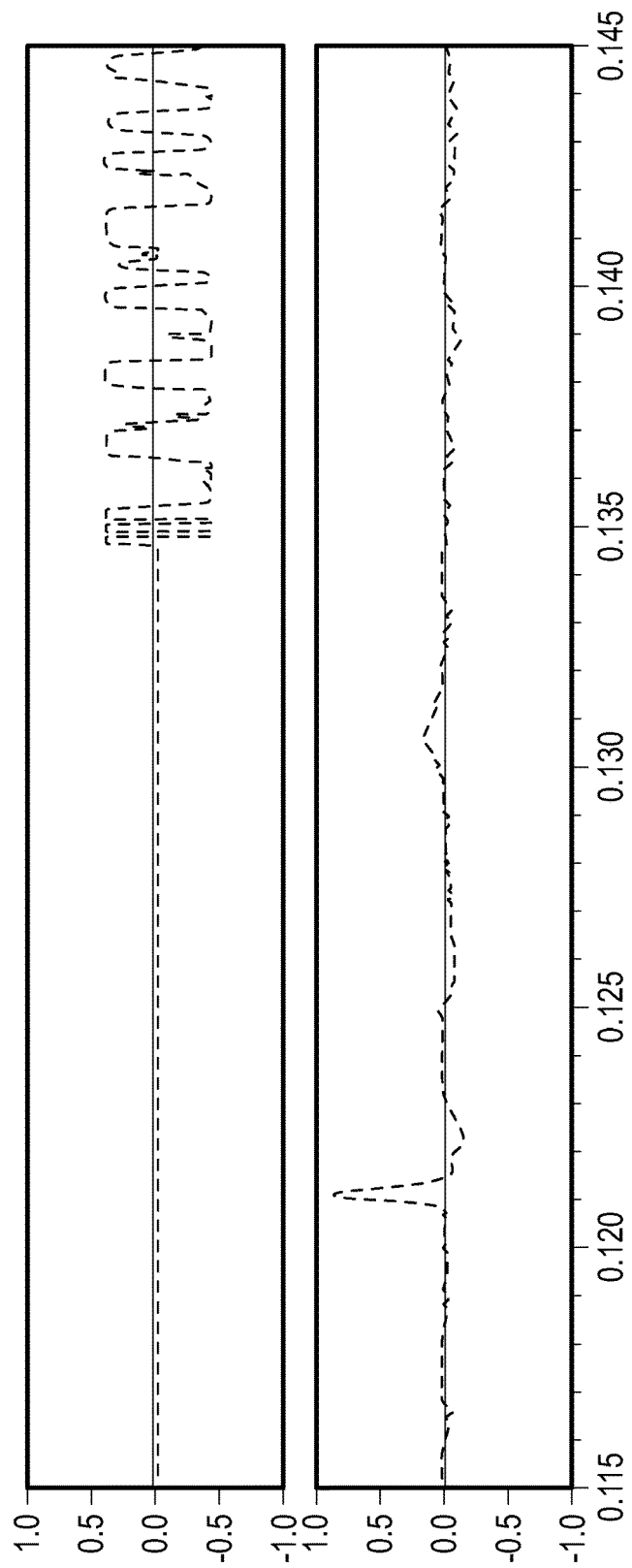
FIG. 4 illustrates exemplary IR and Acoustic onset waveforms consistent with one or more aspects related to the innovations herein.

FIG. 4 illustrates exemplary IR and Acoustic onset waveforms consistent with one or more aspects related to the innovations herein. FIG. 4 presents data from both a microphone and an IR detector. The top waveform is the response to a muzzle blast, which occurs 14 ms after the optical IR flash, shown beneath. Both instruments were co-located, 16 feet away from a rifle shot. The top waveform is the acoustic response to a muzzle blast, which occurs 14 ms after the optical IR flash. The bottom waveform is the response of an (IR) photo diode measuring the muzzle flash. Both instruments were co-located 16 feet away from a rifle shot. The difference in time between the flash and the muzzle onsets gives the distance from the sensor to the shot. The presence of both responses within a mathematically plausible time may provide an effective guard against a spurious event, and the processing of the ratio of amplitudes via implementations herein may allow event type classification. For example, a firecracker may display a stronger IR impulse than a rifle or a pistol. Rifles with flash suppressors may have reduced IR output. Both the shapes and the amplitudes of the two types of impulses and their ratios may be processed by implementations herein to assist in classification. A library of weapon types or firecracker types (or other potential spoofing mechanisms) may be obtained and utilized in practice.

Implementations herein may be configured to process the IR impulse, having an abrupt rise and a short duration, so as to determine the muzzle flash time to under 1 ms. Here, for example, the acoustic onset may be determined to within 1 ms, so the error in the derived range may be under a foot. Further, implementations using two or three sensors may allow accurate determination of the gunfire location in two or three dimensions.

In further implementations, various rooms already having two-way intercoms may be utilized as part of the gunshot detection system. For a room having a speaker connected to a central site at a school, systems and methods herein may utilize the speaker as a microphone in the reverse direction.

Some intermediate regions between indoor and outdoor spaces, for example an entrance foyer to a building, may include acoustic intercoms to screen persons desiring entry. These spaces may be subject to gunfire, and a sensor may be placed in these spaces. The sensor may be independent of the intercom or incorporated into the intercom. Such foyer protection sensors may be part of a traditional outdoor system and may add to the ability of that system to locate gunfire in the neighborhood, or foyer protection sensors may be standalone sensors for specific sites only.

Systems and sensors herein may also have a built-in annunciation capability, including features such speakers or other sources of sound and/or light to alert nearby persons and even distract a shooter in some implementations.

Additionally, sensors may be configured to receive information such as voice messages or other specified phrases from local officials or from the remote Human Reviewers to be broadcast in the incident and nearby rooms. In some implementations, here, a voice chip may be integrated into the sensor, to broadcast phrases to facilitate lockdown or evacuation. For example, once the incident has been verified, a message may be broadcast from and/or pushed to the sensors in every room except the shooter's room that triggers a voice recording which may include evacuation instructions that said something like "warning, a shooting has happened in room ABC. Please proceed with caution to XYZ." Or alternatively "please undertake evacuation procedures avoiding room ABC." The location (blank) part of the phrase could be pushed down, as well, based on the reviewer speaking the correct thing and sending the recording to one or more sensors. Implementations may also utilize flash or EPROM that store the audio sound snippets, which may be customized before install, for each room in a facility. Such sensors with a voice message "push" provide first-responders with potentially valuable information about evacuation that would supersede standard procedures that would only be knowable on a case-by case basis as a result of knowing the exact location of the shooter.

In other implementations, data from the sensors may be utilized to facilitate real-time situational awareness. These implementations may include configuration of sensors and performing processing involving mobile phone and back end cloud interactions.

In certain illustrative mobile phone implementations, the sensors may include a Bluetooth circuit that can turn on after a shooting. This configuration allows various features, such as the following.

Mobile phone users may be able to download an alert application (app) associated with the system. For example, teachers and whoever else who have downloaded such associated alert app previously would then open the application. Via the application, users may get information such as real-time evacuation data sent to them.

The phones or mobile devices, via the activated app, may be able to communicate with each sensor over Bluetooth to facilitate potentially better pinpointing of people within the building. Users may also be able to text messages back to various IRC, law enforcement or other entities involved. Such messages may include the provision of various gunfire and location information as well as other tactical details. Further, via provision of GUI functionality such as simple questions on the screen (e.g., "how many people are in the room with you?") innovations herein may provide invaluable data to first responders.

Additionally, push notifications may be sent to phones that have subscribed to alerts and/or been authenticated. As such, off-campus personnel could be warned not to approach the school—akin to a private amber alert.

The app may present a map with an evacuation route, such as one pushed in real-time by police in communication with the IRC based on the situational awareness provided via the system and methods herein.

Further implementations may include adding circuitry to the sensor that could pick up cellular signals and capture the signal at the sensor via a very short range antenna. Here, systems and methods may sample such cellular signals to record and forward the samples. This functionality may, for example, be turned on whenever the system is on alert due to a gunshot. Such functionality may be used to automatically sample all cell phone signals in the room where the shot was fired. Among other things, these recorded signals may then be sent to a processing component or entity, enabling the police to take action such as properly obtaining a warrant. Samples may also be sent to the cell carrier to facilitate identification of people in the room with cell phones. Then, through various processing (known phone data, process of elimination, etc)—and assuming the shooter brought their phone—anyone not supposed to be on campus may be determined to be a possible shooter.

Figure 5:
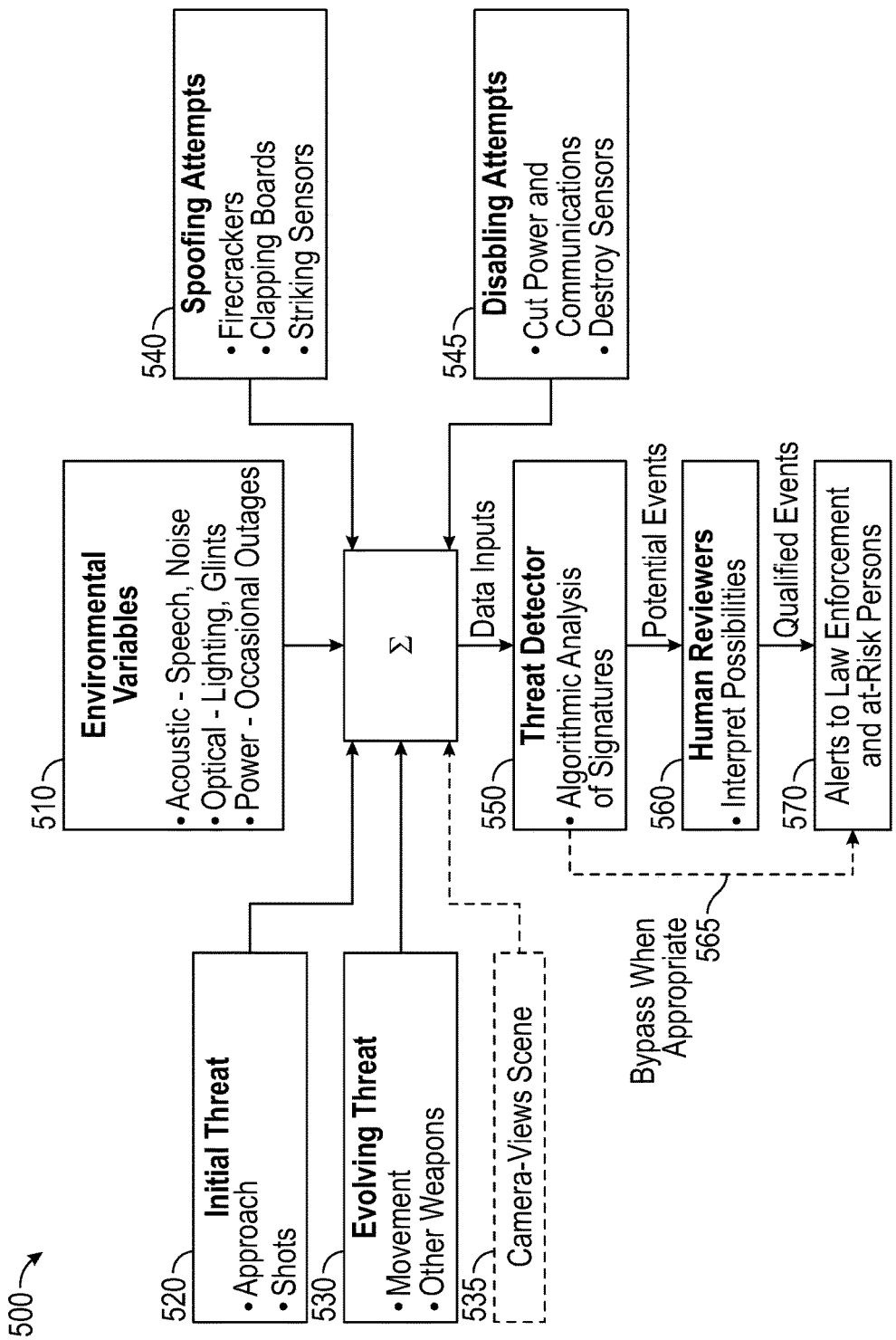
FIG. 5 is a diagram of an illustrative Indoor Gunfire System including features of Environment, Threats, Detection, and Alerts consistent with one or more aspects related to the innovations herein.

FIG. 5 is a diagram of an illustrative Indoor Gunfire System including features of Environment, Threats, Detection, and Alerts consistent with one or more aspects related to the innovations herein. FIG. 5 is a diagram of one exemplary system illustrating the environment, threats and spoofs, detection, the review center, and the alerts. The normal background Environment 510 may present the system with variable inputs which will not cause an alert. The Initial Threats 520 and the Evolving threats 530 yield signatures that may be recognized by the algorithms in the Threat Detector 550. As the shooter moves in a room, the movement may be recognized by the changing relative onset times. As the shooter moves from room to room, different room sensors may respond. All of this information may be passed as 'potential events' to the Human Reviewers 560. If a Camera 535 is present and catches a changing image, that image may be passed to the reviewers. Spoofing 540 and Disabling 545 attempts may occur, and systems and methods herein may be configured to handle them accurately. The reviewers may be trained with many practice sessions to recognize both simulated threats and spoofs. In certain cases a bypass 565 could allow the computer detector to issue an alert directly, as when communications to the review center are lost, or during an ongoing incident if, for example, a quick movement between rooms should be communicated rapidly.

Figure 6:
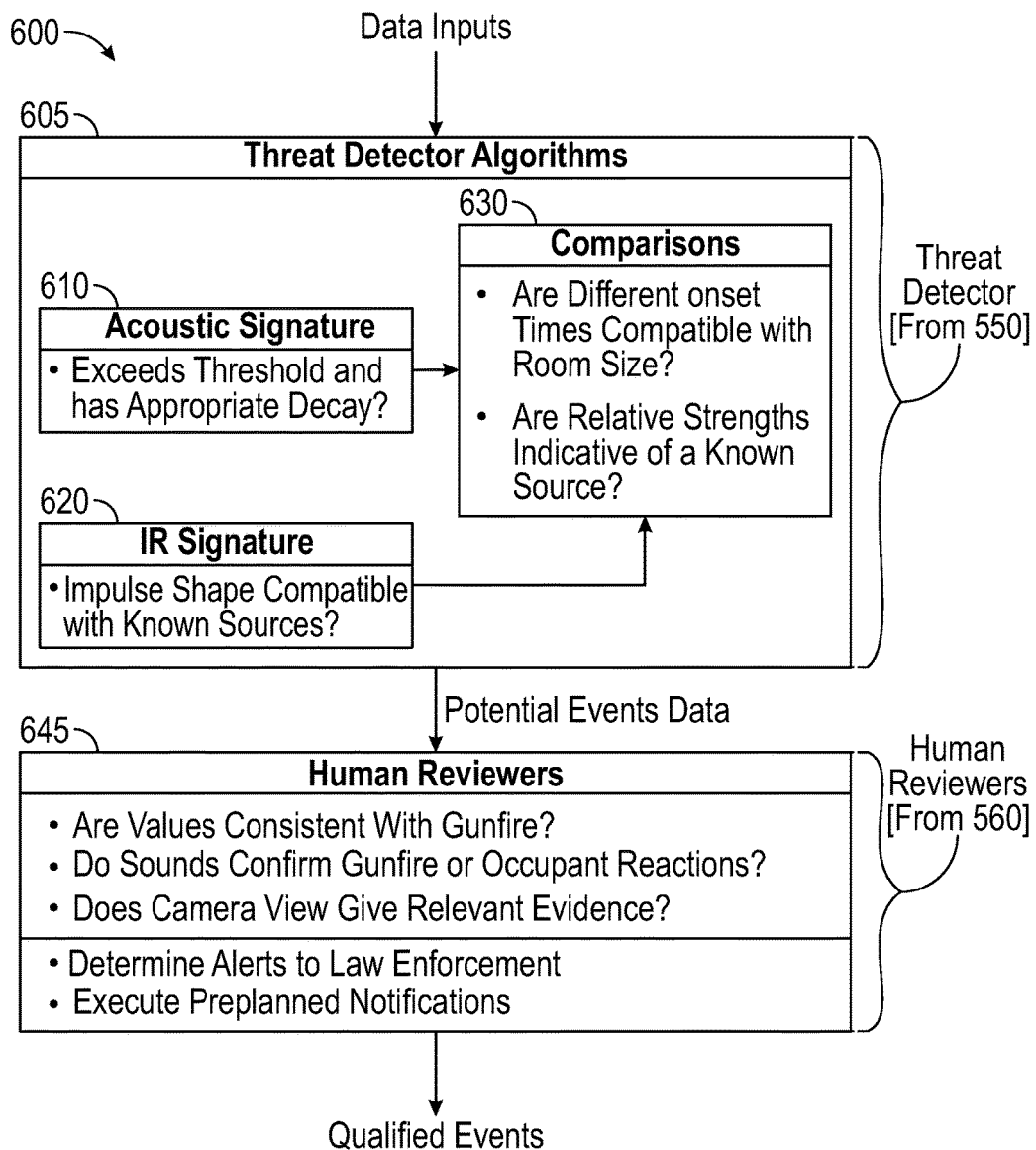
FIG. 6 is a diagram of illustrative Threat Detector and Alert Sub-systems consistent with one or more aspects related to the innovations herein.

FIG. 6 is a diagram of illustrative Threat Detector and Alert Sub-systems consistent with one or more aspects related to the innovations herein. FIG. 6 contains an elaboration of illustrative Threat Detector Algorithms 605 and the Human Reviewer 645 actions. The Acoustic 610 and IR 620 Signatures may be continuously received but not acted upon unless large impulses are received. If an acoustic impulse exceeds a threshold of approximately 120 dB, for example, then it may be inspected for a decay time to match that expected for the volume and absorption of the room. At 620, if an IR impulse is compatible with the expected shape for a weapon, then it may be considered as a potential confirmation to an accompanying acoustic impulse. In some implementations, a comparison 630 may be made between the acoustic and IR impulse onset times which must be equal to or less than the expected transit time of sound across the room. Additionally, e.g. in an effort to classify the potential threat as to a type of weapon or firecracker present, the relative strengths may be measured to see if they match a pattern for a known source. If so, that information may be conveyed to the reviewers along with a snippet of sound for them to evaluate. The reviewers may listen to the sounds after the putative gunfire to determine any occupant verbal reaction. From an evaluation of all of the evidence, the reviewers may issue an alert to local law enforcement and execute any previously determined notifications or other actions.

Figure 7:
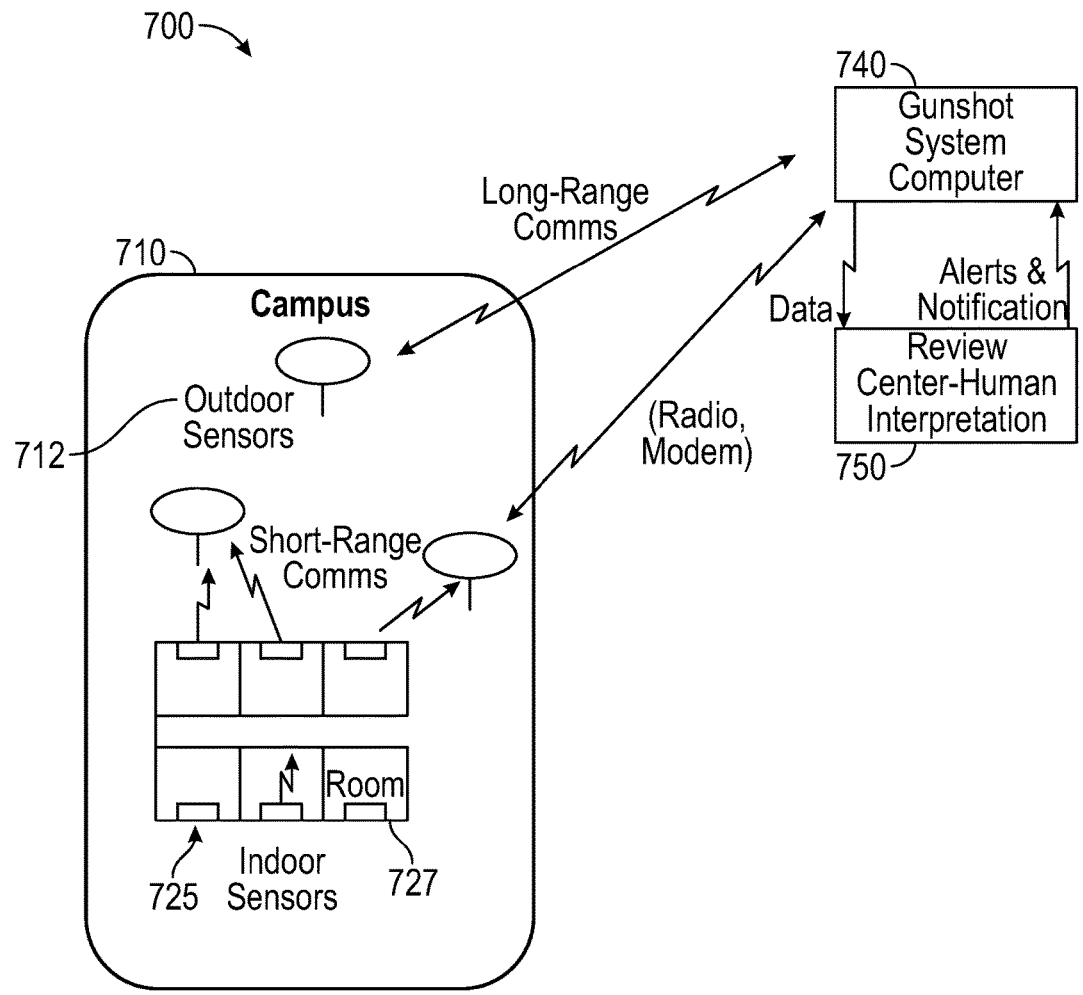
FIG. 7 is a diagram of illustrative Gunfire System Communications features consistent with one or more aspects related to the innovations herein.

FIG. 7 is a diagram of illustrative Gunfire System Communications features consistent with one or more aspects related to the innovations herein. FIG. 7 shows the gunfire system communications links between the Indoor 725 and Outdoor 712 sensors of a Campus 710, the System computer 740, and the Review Center 750. Not shown explicitly are any notifications to auxiliary units such as the cell phones of staff or for remote command of access controls, though such processing may be performed via the one or more processing components inherent/described in the present disclosure. The indoor sensors may have short range communications to the outdoor sensors which in turn may be connected to the system computer by long range communications. The short range communications may be via wire, WiFi or Zygbee, for example. The long range communications may be via radio or cellular mechanisms, for example.

Figure 8:
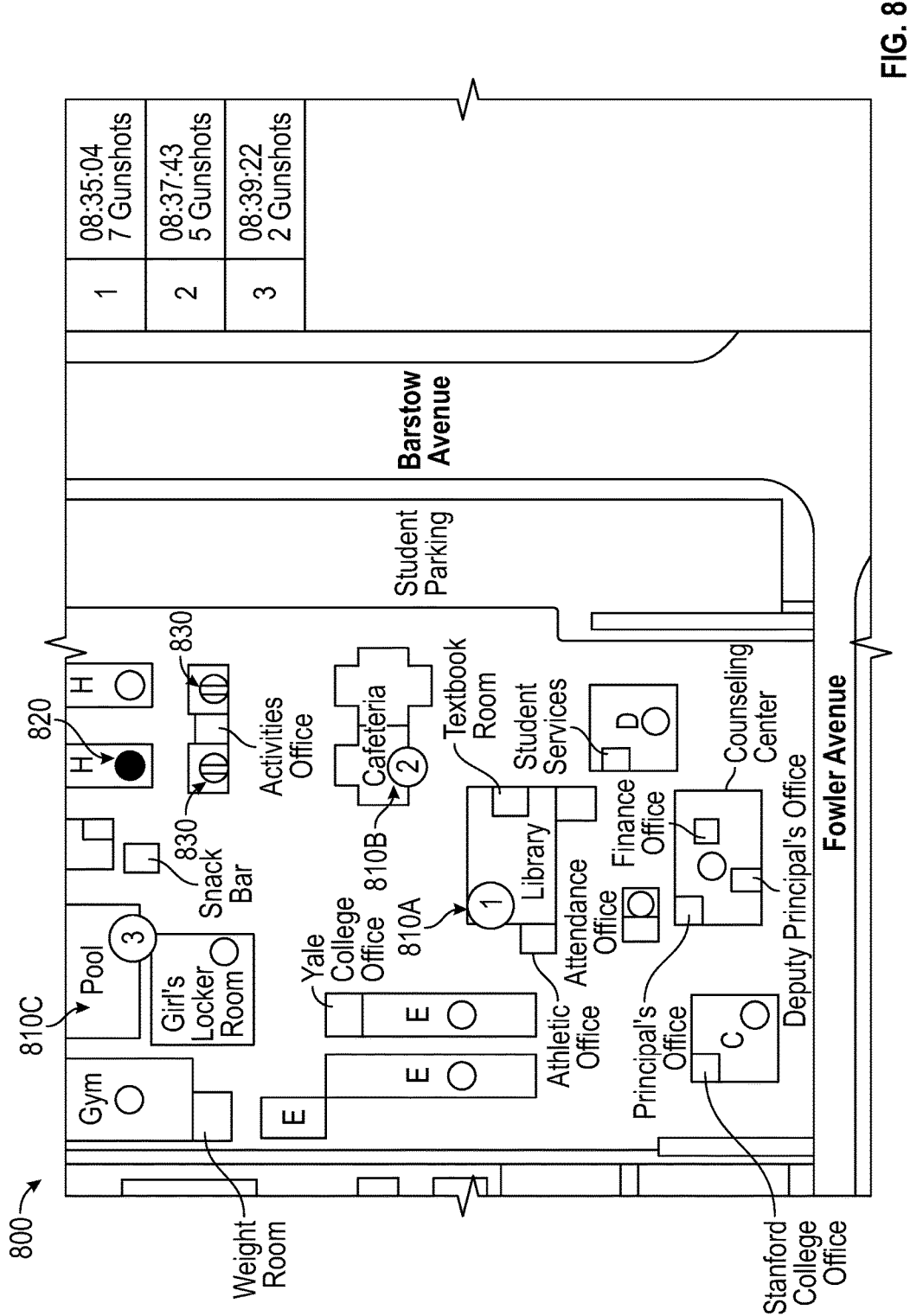
FIG. 8 is a diagram showing an illustrative scenario of usage on a campus consistent with one or more aspects related to the innovations herein.

FIG. 8 is a diagram showing an illustrative scenario of usage on a campus consistent with one or more aspects related to the innovations herein. According to systems and methods herein, many rooms will have indoors sensors, and, in some implementations, additional outdoor sensors may be utilized to cover the area of the whole campus and surroundings. Referring to FIG. 8, the diagram illustrates graphical information provided, such as the output of a mobile computer screen in use by first responders. The dot sequence, 810A, 810B, 810C (with numbers inside) gives the locations of a sequence of shootings and on the right side a timeline indicates the number of shots at each of these locations. Each campus may have its own pre-determined notification plan, which could include calling staff's cell phones to inquire if staff members have heard any shootings and if they need assistance. The grayed dots 820 indicate positions of subscribed cellphones of teachers or administrators in their respective rooms who have reported they are okay. The crosshatched dots 830 represent cellphones not responding, which may indicate locations of potential victims.

As disclosed herein, implementations and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe source code editing components such as software, systems and methods consistent with the present invention may be implemented with any combination of hardware, software and/or firmware. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the inventions herein. Other implementations are within the scope of the present inventions.

The invention claimed is:

1. An indoor gunshot detection system comprising:
  indoor sensors arranged to detect gunfire in a series of enclosed spaces having significant acoustic reverberation;
  wherein the sensors are constructed with microphones designed to detect high amplitude impulses between about 120 dB to about 160 dB from nearby gunfire;
  one or more processing components and/or computer readable media configured to process potential gunshot data utilizing knowledge of particular sensor positions and designed to:
    analyze impulses received by the indoor sensors, determine if the impulses are gunfire, and
    pass alerts to at least one of local authorities, persons at risk, or a central alert facility; and
  at least one networking component constructed and arranged to transmit communications between the indoor acoustic sensors, the processing components and/or computer readable media, and computing devices that receive the alerts;
  wherein the one or more processing components and/or computer readable media are configured perform comparison processing between the acoustic impulse and IR impulse onset times to classify a received impulse as a potential threat.

2. The system of claim 1, wherein a threshold of an acoustic impulse's magnitude is reached before an alert is passed, in order to discard impulsive events too weak to be gunfire.

3. The system of claim 1, wherein the passing alerts comprises transmitting data to human reviewers of the data via the communication network, and wherein the data sent to the human reviewers comprise recorded impulsive sounds from the enclosed spaces and/or information defining a visual presentation of the acoustic and/or IR waveforms.

4. The system of claim 3, wherein sound data sent to the human reviewers comprise any distressed occupant sounds within the enclosed spaces where the putative event occurs.

5. The system of claim 1, wherein the sensors include cameras that capture picture or video data, and wherein one or more pictures or videos, recorded by a camera starting at an instant of concern triggered by an impulsive sound, are transmitted to a central alert facility.

6. The system of claim 1 wherein the processing components are further configured to process data collected from outdoor acoustic sensors disposed in areas adjacent to the series of enclosed spaces, such that shooting incidents transitioning between indoor areas and outdoor areas are detected.

7. The system of claim 1, wherein the processing further comprises comparing the one or more of decay times and/or shapes of both a low gain channel and a high gain channel of a multi-channel room sensor against the expected theoretical decay times and/or shapes.

8. The system of claim 1 wherein relative strengths of the acoustic and the IR impulses are measured and processed to determine if they match a pattern of a known source.

9. The system of claim 1, wherein one or more of the sensors are configured to provide audio and/or visual announcement(s), including speakers or other sources of sound and/or light that alert nearby persons during an active threat.

10. The system of claim 1, one or more of the sensors include an antenna, a wireless communication component, and/or circuitry that detects presence of nearby mobile phones to establish communication therewith and/or to determine if a nearby phone is associated with a known person or a possible shooter.

11. An indoor gunshot detection system comprising:
  indoor sensors arranged to detect gunfire in a series of enclosed spaces having significant acoustic reverberation;
  wherein the sensors are constructed with microphones designed to detect high amplitude impulses between about 120 dB to about 160 dB from nearby gunfire;
  one or more processing components and/or computer readable media configured to process potential gunshot data utilizing knowledge of particular sensor positions and designed to:
    analyze impulses received by the indoor sensors, determine if the impulses are gunfire, and
    pass alerts to at least one of local authorities, persons at risk, or a central alert facility; and
  at least one networking component constructed and arranged to transmit communications between the indoor acoustic sensors, the processing components and/or computer readable media, and computing devices that receive the alerts;
  wherein the one or more processing components and/or computer readable media are configured to perform comparison processing between the acoustic impulse and IR impulse characteristics to classify a received impulse as a potential threat.

12. The system of claim 11 wherein the processing involves one or more of decay times and/or shapes corresponding to expected theoretical decay times and/or shapes which depend on a known size and acoustic treatment of the room.

13. The system of claim 11 wherein, when an entire decay curve cannot be processed due to saturation of the signal, a slope of the decay can be used instead of the decay time.

14. The system of claim 11, wherein a threshold of an acoustic impulse's magnitude is reached before an alert is passed, in order to discard impulsive events too weak to be gunfire.

15. The system of claim 11, wherein the passing alerts comprises transmitting data to human reviewers of the data via the communication network, and wherein the data sent to the human reviewers comprise recorded impulsive sounds from the enclosed spaces and/or information defining a visual presentation of the acoustic and/or IR waveforms.

16. The system of claim 15, wherein the sound data sent to the human reviewers comprise any distressed occupant sounds within the enclosed spaces where the putative event occurs.

17. The system of claim 11, wherein the sensors include cameras that capture picture or video data, and wherein one or more pictures or videos, recorded by a camera starting at an instant of concern triggered by an impulsive sound, are transmitted to a central alert facility.

18. The system of claim 11 wherein the processing components are further configured to process data collected from outdoor acoustic sensors disposed in areas adjacent to the series of enclosed spaces, such that shooting incidents transitioning between indoor areas and outdoor areas are detected.

19. The system of claim 11, wherein the processing further comprises comparing the one or more of decay times and/or shapes of both a low gain channel and a high gain channel of a multi-channel room sensor against the expected theoretical decay times and/or shapes.

20. The system of claim 11 wherein relative strengths of the acoustic and the IR impulses are measured and processed to determine if they match a pattern of a known source.

21. The system of claim 11, wherein one or more of the sensors are configured to provide audio and/or visual announcement(s), and including speakers or other sources of sound and/or light to alert nearby persons during an active threat.

22. The system of claim 11, wherein the system is configured to provide one or more audio announcements, via at least one intercom and/or one or more of the sensors, comprising verbal information providing instructions to people located in one or more rooms.

23. The system of claim 11, one or more of the sensors include an antenna, a wireless communication component, and/or circuitry that detects presence of nearby mobile phones.

24. The system of claim 23 wherein presence of the nearby mobile phones is determined to establish communication therewith and/or to determine if a nearby phone is associated with a known person or a possible shooter.

* * * * *